March 29, 1955 H. D. POST ET AL 2,705,262

TAPE RECORDERS AND THE LIKE

Filed Aug. 12, 1953 2 Sheets-Sheet 1

INVENTORS.
HERMAN D. POST,
CHARLES A. VOGEL
by- [signature]
ATTORNEY

March 29, 1955 H. D. POST ET AL 2,705,262

TAPE RECORDERS AND THE LIKE

Filed Aug. 12, 1953 2 Sheets-Sheet 2

INVENTORS.
HERMAN D. POST.
CHARLES A. VOGEL by- [signature]

ATTORNEY

United States Patent Office 2,705,262

Patented Mar. 29, 1955

2,705,262

TAPE RECORDERS AND THE LIKE

Herman D. Post, Little Neck, and Charles A. Vogel, Valley Stream, N. Y., assignors to Telectro Industries Corp., Long Island City, N. Y., a corporation of New York Application August 12, 1953, Serial No. 373,847

9 Claims. (Cl. 179—100.2)

The present invention relates to tape recoders and the like and more particularly to means for controlling the travel of the tape record and the relative position thereof with respect to other components of a recording and play-back apparatus which cooperate with said record during various phases of operation of such apparatus.

Tape recorders include a pair of reels which serve to supply and take up the tape wound on them, means to revolve said reels in one direction respectively and then in reverse as required and there are driving rollers effecting a nip on the tape which at times need be released therefrom, a sound head and an eraser magnet with which the tape need be in a prescribed relation during various phases of operation and various electrical means controlled by a manually-operated switch in their circuit; the operating member of such switch having prescribed positions to be set in, so that the apparatus shall be in condition to record, play back and be idle. The reels are on shafts having pulleys connected by a system of belting or the like which may be driven by an electric motor, but other than such driving means, this invention is not concerned with the electrical system of the apparatus, except a mechanical adaptation of said switch operating member. Hence no other part of such electrical system is herein illustrated, except those components the tape cooperates with, in passing from reel to reel.

The principal object of this invention is to provide novel and improved means for controlling the travel of the tape record and the relative position thereof with respect to other components of a recording and play-back apparatus commonly called electric or electronic wire or tape recorders; the record whether a wire or tape, being herein referred to as the tape.

Another object hereof is to provide novel and improved means for effecting tape travel in either direction as required, without the use of clutch mechanisms or reversing gear means, but by the use of belt tighteners cooperating with novel and improved belting arrangements and by utilizing the manually shiftable electrical switch operating member to accomplish certain work for tape drive and release.

A further object hereof is to provide a novel and improved tape travel controlling means of the character mentioned, which is simple in construction, easy to operate, positive in action, reasonably cheap to manufacture and efficient in carrying out the purposes for which it is designed.

Other objects and advantages will become apparent as this disclosure proceeds.

In the accompanying drawings forming part of this specification, similar characters of reference indicate corresponding parts in all the views.

Figure 1:
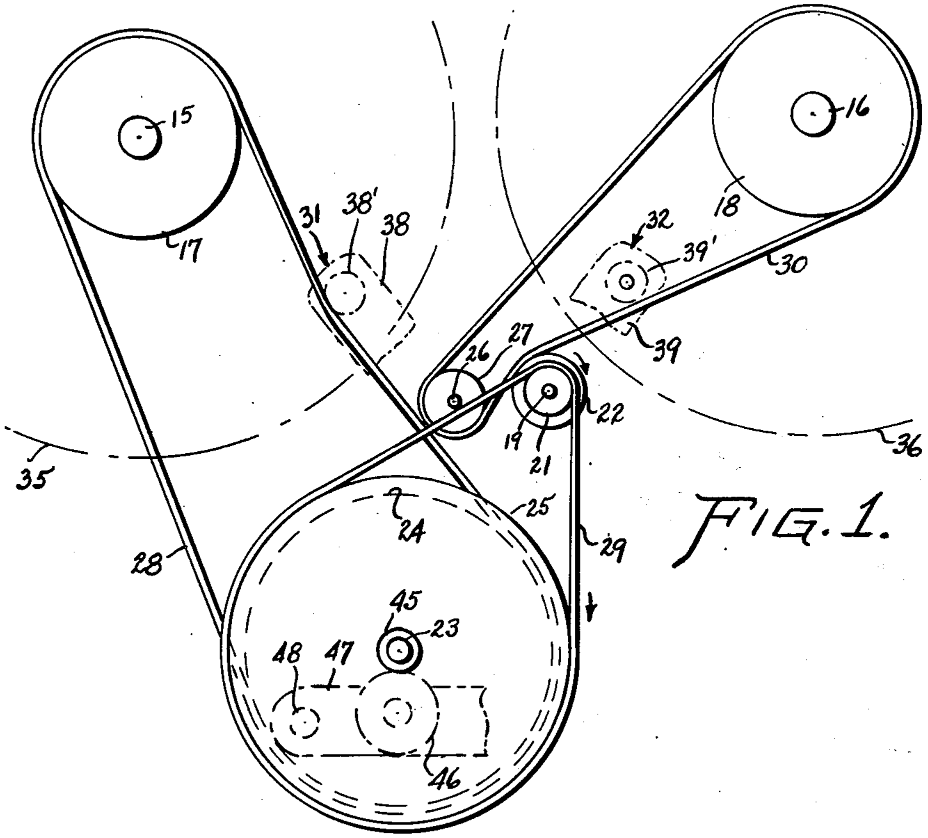
Fig. 1 is a top plan view in diagrammatic fashion, showing the belt drives and indicating the associated belt tighteners and a shiftable tape-nipping roller included in this preferred embodiment of the present invention.
Figure 3:
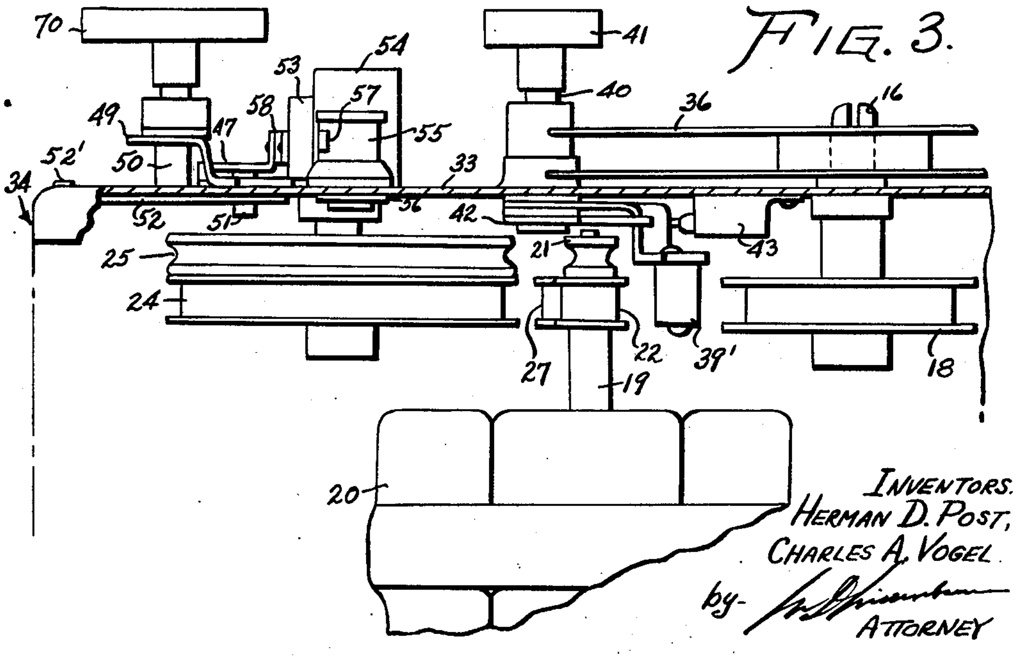
Fig. 3 is a fragmentary side view of Figs. 1 and 2 combined in the casing which houses them or on which parts thereof are mounted; said casing being shown broken away.

In the preferred embodiment illustrated in the drawings, the numerals 15 and 16 designate the reel shafts which carry secured thereon the pulleys 17 and 18 respectively. The main shaft 19 may be the shaft of an electric motor 20, carrying secured thereon the pulleys 21 and 22. The numeral 23 denotes a shaft having secured thereon the idler pulleys 24 and 25 which turn together. The numeral 26 indicates a shaft carrying the idler pulley 27 thereon. Pulleys 17 and 24, are connected by a loose endless belt 28. Pulleys 21 and 25, are connected by a tight endless belt 29. Pulleys 18 and 27, are connected by a loose endless belt 30, whose outside surface contacts the periphery of pulley 22. The numeral 31 denotes generally a tightener for belt 28. The numeral 32 denotes generally a tightener for the belt 30, acting against the inside surface of said belt 30, so that when the latter is tight, it will be driven by the main shaft pulley 22. The reel shafts 15 and 16, extend through the top panel 33 of the casing 34 which houses the apparatus, and at their upper ends are adapted to releasably engage the reels 35, 36 respectively which have the sound tape 37 wound thereon. The arrangement herein is such that reel 16 is the supply reel while reel 15 serves as the take-up reel, during operation of the apparatus for making a record and during play-back; the tape 37, travelling in the same direction in both such instances.

Figures 2, 4, 5:
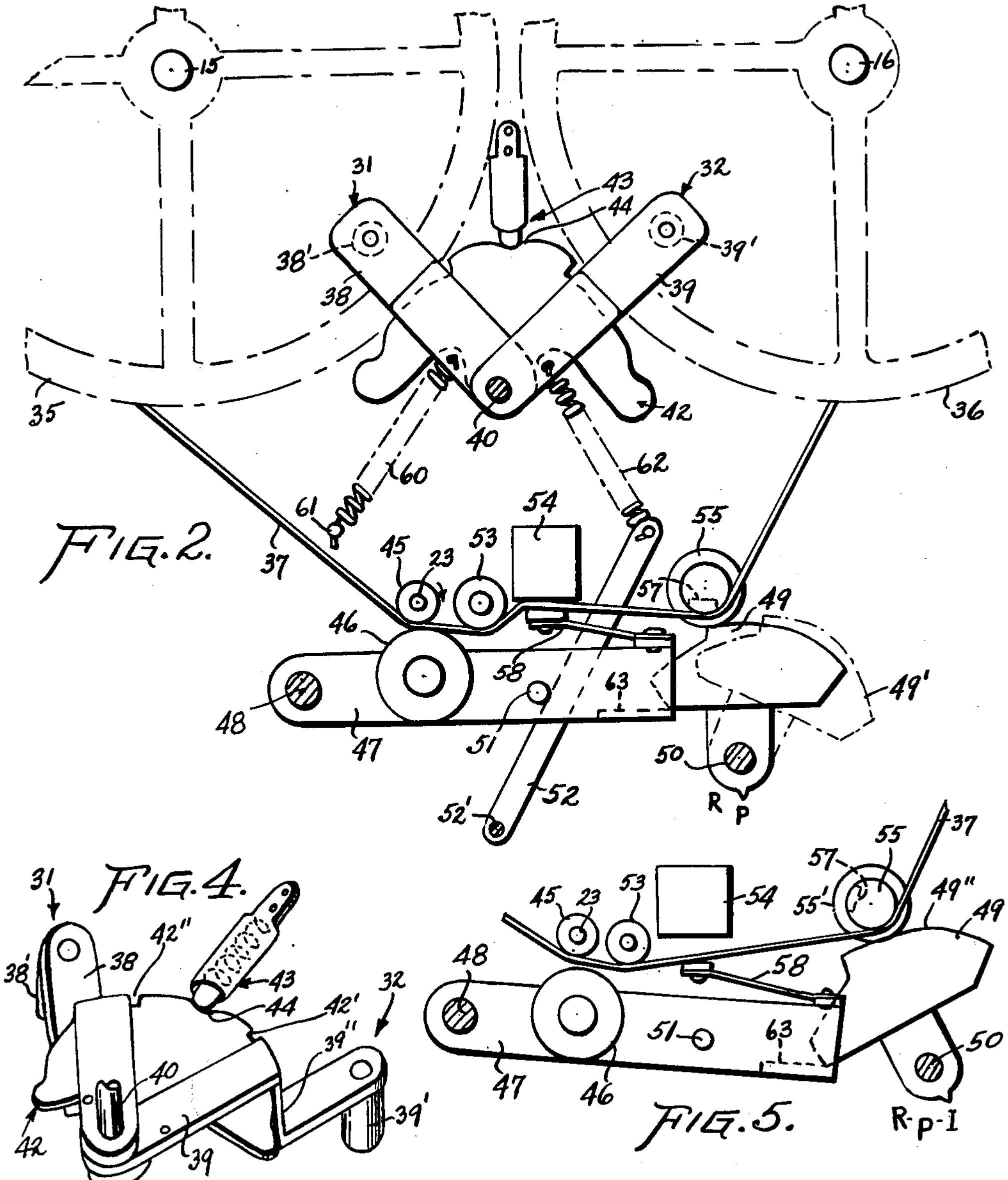
Fig. 2 is a top plan view in diagrammatic fashion, showing the selective belt-tightening mechanism and the cam for controlling the nip rollers for driving the tape and for positioning the "eraser" magnet.
Fig. 4 is a perspective view showing the belt tighteners and their manually controlled cam which serves for their manipulation.
Fig. 5 is a top plan view in diagrammatic fashion, showing various components of the tape recorder apparatus with the tape released from the nipping drive rollers used in this apparatus.

The swingable belt-tightener arms 38 and 39 are loose on the journalled shaft 40 which securely carries the hand knob 41 above the casing 34 and also has secured thereon a shifter 42 adapted upon manual manipulation of said knob, to move one of said arms at a time to tighten the belts 28 and 30, respectively. This is accomplished when edge 42′ contacts and moves arm 38, and when edge 42″ contacts and moves the arm 39, respectively. The shifter 42 is yieldingly held in normal rest position as shown in Fig. 2, by the spring-loaded plunger means indicated generally by the numeral 43, which sets in the notch 44 which is midway between said edges 42′, 42″. The shifter 42 is a flat piece and each of the arms 38, 39 have a bend in them as at 39″ as shown in Fig. 4, in the path of the edges 42′, 42″, respectively.

The shaft 23 which is constantly driven by belt 29, has a roller 45 secured thereon. This roller 45 cooperates with roller 46 rotatably mounted on the arm 47 which is swingably mounted on axis pin 48. When said arm 47 is in position whereby rollers 45 and 46 nip the tape 37, said tape is drawn off the reel 36. When said arm 47 is shifted by cam 49 as in Fig. 5, the roller 46 is moved away and the driving of said tape 37 by said nipping rollers, halts. Said cam 49 is secured on the shaft 50 which is the operating member of the electrical switch (not shown) controlling the operation of the recording and play-back electrical circuits of the recorder apparatus. Such circuits being no concern of this invention, they are not shown and it may be noted that such circuits are well known to those versed in this art.

Figure 6:
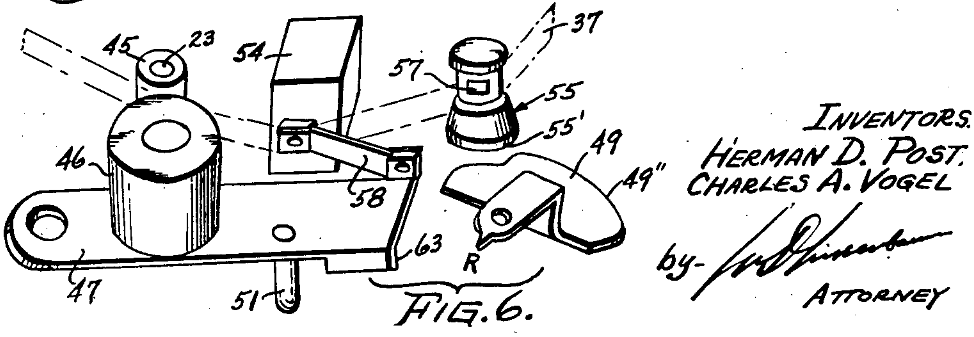
Fig. 6 is an exploded perspective view of various components included in Fig. 5, in their relative position when the apparatus is used for recording.

The pin 51 extending from the arm 47 acts against the arm 52 to shift same about the fixed axis 52′ when said arm is moved by the cam 49. A suitable opening is provided through the panel 33 to permit such pin movement. All other components shown in Fig. 6 are atop the casing 34 and included amongst them are the idler roller 53, the sound head 54 and the swivelly mounted post 55 which is spring loaded by means of a spiral spring 56 and carries the "erasing" magnet 57. The arm 47 carries a blade spring finger 58 to press against the tape 37 so that the latter contacts the sound head 54 during "play" position of the switch operating member 50 and during "recording" position of said switch operating member as shown in Figs. 2 and 6 respectively. In "recording" position, the parts are as arranged in Fig. 2, water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 $cm.^3$ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

arm is moved whereby said sound record is released from the nipping rollers.

3. The apparatus as defined in claim 1, wherein the means for driving the third belt comprises a motor having a shaft, mounted on the frame and wherein the pulleys constituting the mentioned first unit are secured on said motor shaft for rotation therewith.

4. The apparatus as defined in claim 1, wherein the means for holding the second belt-tightening means in position whereby the second belt is sufficiently tightened to drive the take-up reel with considerable slippage, is a straight helical coil spring connected one end to the frame and its other end to said second belt-tightening means; said coil spring being bendable and stressed when bent upon movement of the second belt-tightening means to tighten the second belt; said coil spring returning to straight condition upon movement of said second belt-tightening means to loosen the second belt.

5. The apparatus as defined in claim 1, wherein each of the belt tightening means comprises an arm pivotally mounted on the frame and carrying an element adjacent a face of the belt it is associated with, adapted to engage and move such belt into tightened condition upon movement of said arms respectively in predetermined directions and including a manually movable member mounted on the frame between said tightening means arms and adapted to engage them one at a time to move them into belt-tightening position respectively.

6. The apparatus as defined in claim 5, wherein said manually movable member is provided with a notch and including a spring-loaded detent movably mounted on the frame engaging said notch and releasable therefrom; said detent holding said member against movement when in said notch and such engagement obtaining when said member is not acting on either of said tightening means arms to move them into belt-tightening position.

7. The apparatus as defined in claim 1, including a movable switch-operating member for an electrical switch controlling the recording and play-back means of said apparatus and wherein the means for moving and holding the arm which carries the second nipping roller comprises said switch-operating member and an element extending therefrom; said element being in the path of said arm and adapted to engage and move same upon movement of said switch operating member in a predetermined direction; said switch-operating member being mounted on the frame.

8. The apparatus as defined in claim 7, including a fixed sound head and a movably mounted magnet on the frame and both facing one surface of the record member; said sound head being positioned between said magnet and the nipping rollers and said magnet being positioned between said sound head and the supply reel, a spring finger extending from the arm carrying the second nipping roller and positioned on said arm that said finger shall press the record member against the sound head when said arm is in position whereby said record member is nipped by the nipping rollers and cooperative means on the mentioned switch-operating member and said magnet for moving said magnet away from said record member upon movement of said switch-operating member whereby said arm is moved thereby so that the record member is released from the nipping rollers.

9. The apparatus as defined in claim 8, wherein said magnet is rotatably mounted about an axis on the frame and including spring means for returning said magnet to the position where it faces the record member when the latter is nipped by the nipping rollers.

No references cited.